(12) United States Patent
Okutubo et al.

(10) Patent No.: US 11,537,557 B2
(45) Date of Patent: Dec. 27, 2022

(54) INCREMENTALLY IMPROVING CLUSTERING OF CROSS PARTITION DATA IN A DISTRIBUTED DATA SYSTEM

(71) Applicant: Microsoft Technology Licensing, LLC, Redmond, WA (US)

(72) Inventors: Babatunde Micheal Okutubo, Bellevue, WA (US); Maninderjit Singh Parmar, Redmond, WA (US); Edgars Sedols, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 426 days.

(21) Appl. No.: 16/881,379

(22) Filed: May 22, 2020

(65) Prior Publication Data

US 2021/0365407 A1 Nov. 25, 2021

(51) Int. Cl.
*G06F 16/00* (2019.01)
*G06F 16/13* (2019.01)
*G06F 16/27* (2019.01)
*G06F 16/28* (2019.01)

(52) U.S. Cl.
CPC .............. *G06F 16/13* (2019.01); *G06F 16/27* (2019.01); *G06F 16/285* (2019.01)

(58) Field of Classification Search
CPC ........ G06F 16/13; G06F 16/27; G06F 16/285; G06F 16/35; G06F 16/38
USPC .................................................. 707/737, 740
See application file for complete search history.

(56) References Cited

U.S. PATENT DOCUMENTS

| | | | | |
|---|---|---|---|---|
| 2018/0068008 A1* | 3/2018 | Cruanes | ............... | G06F 16/2282 707/707 |
| 2019/0034520 A1* | 1/2019 | Jalagam | ................... | G06F 16/27 707/707 |
| 2020/0265098 A1* | 8/2020 | Tepper | ................... | G06V 10/82 707/707 |
| 2021/0349648 A1* | 11/2021 | Fatemieh | ............... | G06F 16/278 707/707 |

OTHER PUBLICATIONS

Park, et al., "File Defragmentation Scheme for a Log-Structured File System", In Proceedings of the 7th ACM SIGOPS Asia-Pacific Workshop on Systems, Aug. 4, 2016, 7 Pages.
"International Search Report and Written Opinion Issued in PCT Application No. PCT/US2021/028270", dated Jul. 14, 2021, 10 Pages.

* cited by examiner

*Primary Examiner* — Alexandria Y Bromell
(74) *Attorney, Agent, or Firm* — Fiala & Weaver P.L.L.C.

(57) ABSTRACT

Methods and systems are provided for improved access to rows of data in a distributed data system. Each data row is associated with a partition. Data rows are distributed in one or more files and an impure file includes data rows associated multiple partitions. A clustering set is generated from a plurality of impure files by selecting a candidate impure file based on file access activity metrics and one or more neighbor impure files. Data rows of the impure files included in the clustering set are sorted according to their respective associated partitions. A set of disjoint partition range files are generated based on the sorted data rows of the impure files included in the clustering set. Each file of the set of disjoint partition range files is transferred to a respective target partition.

20 Claims, 7 Drawing Sheets

INCREMENTALLY IMPROVING CLUSTERING OF CROSS PARTITION DATA IN A DISTRIBUTED DATA SYSTEM

BACKGROUND

Today's big data systems provide effective ways to analyze and extract information from large complex datasets that are difficult to manage using traditional data processing application software. Current developments in big data systems involve such topics as capturing and storing data, searching data, data analysis, transferring data, sharing data, querying data, and data visualization. Data scientists strive to find techniques to handle the ever growing datasets with more efficient use of system resources and reduced processing times.

In a distributed relational data management system, data may be partitioned horizontally using a partitioning key to distribute rows of data into different partitions (e.g., physical or virtual storage devices, or portions thereof). In some embodiments, rows within a partition may be compressed in a row or columnar format forming files, to reduce the size of the data. This format allows for vectorized data processing and is more suitable for building a cloud based analytical engine. System performance tends to be better, in terms of compression and storage, when the file can be packed with a sufficient number of rows.

In a situation where there are not enough rows to form a pure file for one partition, rows belonging to different partitions can be combined to form an impure file. As multiple loads are received, impure files may be created with rows belonging to multiple partitions. Impure files may be described as belonging to a special partition called the "impure partition." The impure partition includes cross partition data. In other words, impure files may be stored in or otherwise associated with the impure partition that contains only impure files. When enough rows are received to form a pure file (a file containing rows from a single partition), the pure file is stored in a "pure partition" (a partition containing only pure files). Although there may only be one impure partition, there may be a separate "pure partition" for each pure file. Having this one to one relationship enables increased partition elimination, allowing a scan process for data associated with a particular partition to scan a single pure partition and not scan other pure partitions. However, all of the files in the impure partition would also have to be scanned to find the files associated with the particular partition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided in a computing device for improved access to rows of data. Each data row is associated with a partition of a plurality of partitions. The data rows are distributed in one or more files. A file that includes data rows associated different partitions is an impure file. A clustering set is generated from a plurality of impure files. For example, a candidate file is selected from the plurality of impure files for inclusion in the clustering set based on file access activity metrics for the one or more impure files. One or more neighbor files are selected from the plurality of impure files for inclusion in the clustering set. Data rows of the impure files included in the clustering set are sorted according to their respective associated partitions. A set of disjoint partition range files are generated based on the sorted data rows of the impure files included in the clustering set. Each file of the set of disjoint partition range files is transferred to a respective target partition.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
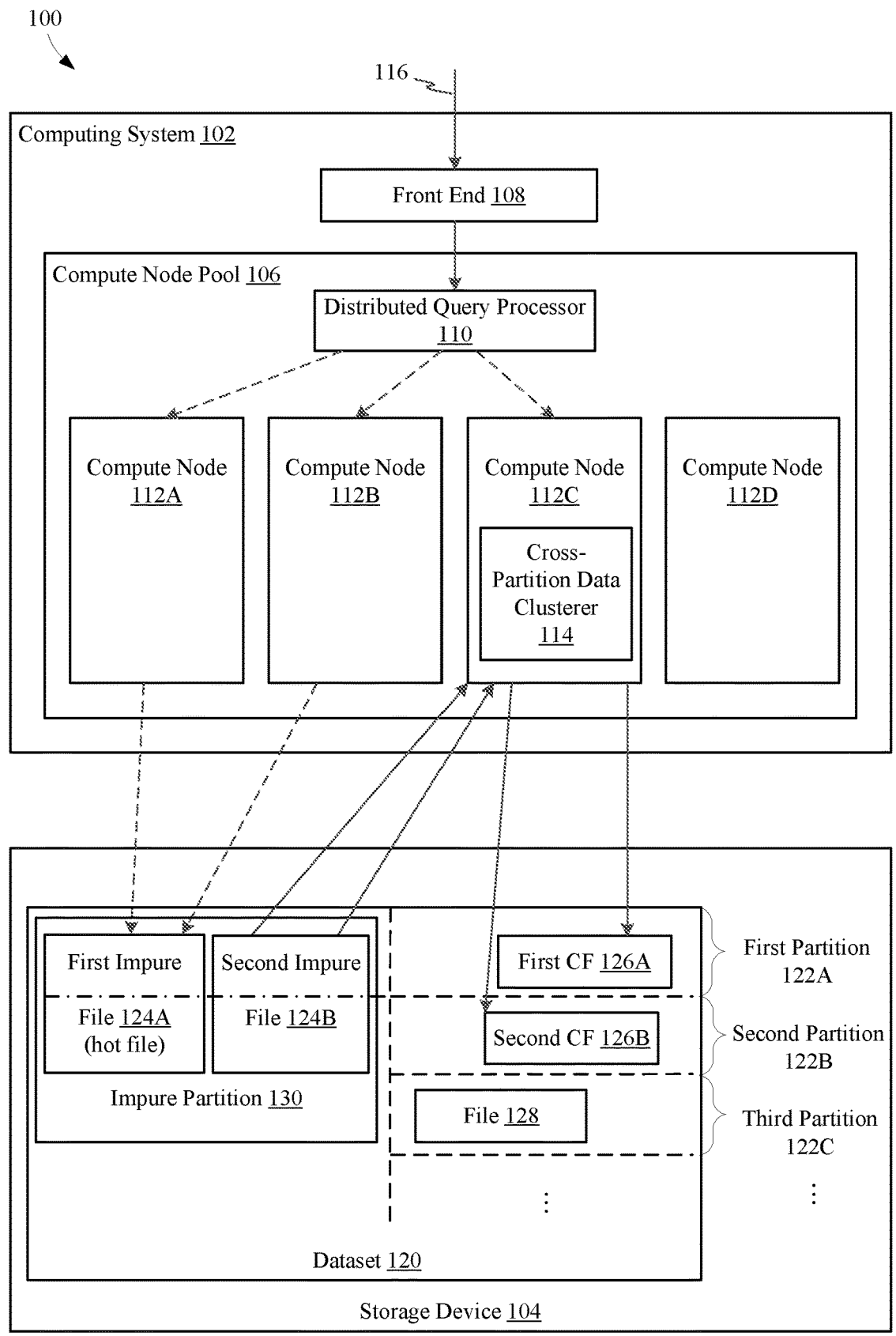
FIG. 1A is a block diagram of a system for incrementally improving clustering of cross partition data in a distributed data system, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Data that is stored in a distributed relational data management system may be partitioned horizontally using a partitioning key to distribute rows of data into different target partitions where they may be scanned in response to a query. Rows within a partition may be compressed in a row or columnar format to form files. This compressed format allows for vectorized data processing and is more suitable for building a cloud based analytical engine. Compression and storage performance depends upon having enough rows in a file to create a pure file stored in a pure partition. The pure partition may include rows of one file, and the pure file may have its rows stored in one pure partition. However, in instances where there are not enough rows to form a file in a pure partition (e.g., containing a predetermined number of rows), row belonging to multiple target partitions can be combined to form an impure file. For example, as multiple loads of data are received with an insufficient numbers of rows, an impure file is created having rows associated with multiple target partitions. One or more impure files may be stored together in a special partition referred to as an "impure partition." In instances when enough rows are received to form a pure file, the pure file is stored in a pure partition.

As multiple sets of data loads are received in a data management system, files may accumulate in an impure partition. Multiple files stored in the impure partition can contain rows associated with the same target partition (e.g., a partition of interest during a user query scan). During a scan, in order to find all the rows associated with a particular partition of interest, in addition to reading the file in the (pure) partition of interest, all the files in the impure partition having rows associated with the partition of interest would also be read. Searching in multiple locations to find the queried data results in a significant overhead cost. For example, the more files stored in an impure partition, the more files that must be read to fetch rows during a scan, because the data rows for the target partition could potentially be spread across multiple files in the impure partition.

Methods and systems are provided to improve the clustering of files in an impure partition by grouping together rows in impure files that belong to the same target partition. As a result of grouping the rows associated with the same target partition (e.g., sorting based on an order key or a target partition identifier), when there are enough rows to form a file for a pure partition, a new pure file is created. Rows of the new pure file are all associated with the same target partition. The new pure file is then moved to the target partition (pure partition) and removed from the impure partition. The methods and systems provided herein include an online operation in cloud and non-cloud scenarios where the number of files in an impure partition are incrementally reduced to decrease (e.g., minimize) the impact on customer queries.

By implementing these methods online, with a goal of minimizing impact to overall system resources, the various embodiments of the solution become more challenging. For example, reducing the amount of data stored in an impure partition and moving the data to pure partitions for improved scanning efficiency, cannot be implemented effectively by simply reading all the rows of files stored in the impure partition into memory and sorting the rows by an order key (e.g., their target partition identifier (ID)) at the same time. In practice, this technique is not feasible because of resource constraints. For example, generally there is not enough memory available to sort all of the data of an impure partition without spilling. The present solution allows the system to perform operations on the impure files in a fault tolerant way without blocking incoming loads to the impure partition.

In some embodiments, the clustering improvement operations may be delegated to a background task, which may operate as part of a user's data management system (e.g., that executes user queries). The clustering improvement operations may share the same memory and compute resources with the user's system. Alternatively, or in addition, the clustering improvement operations may be delegated to a separate compute pool (e.g., in the cloud). These methods provide flexibility relative to resource constraints as well as the environment the clustering improvement system is running on. Given that the process might involve taking locks on certain files, which might interfere with the performance of user queries involving data present in these files, a policy may be set in place to cancel a clustering background task. The clustering background task may be rescheduled for execution after the user query has finished.

The disclosed clustering improvement methods include an incremental process that may be performed over multiple iterations to complete the clustering process. For example, instead of selecting all the files in the impure partition to sort, a subset of the files may be selected and sorted. By iteratively selecting and sorting subsets of files from an impure partition, a state of convergence may be reached where the rows of data in the impure files are clustered based on their order key (e.g., their target partition ID). During the process, a group of pure files (files where all rows belong to single target partition) are moved out of the impure partition to the corresponding target partition. At this point there may be some residue rows remaining in the impure partition. The decision on how many files to select at a time for a sorting operation may be based on system constraints and the current system load. The memory requirements for the clustering process may be proportional to the number of impure files to be sorted concurrently as well as the datatype of columns in the table schema. In instances where there are upper bounds on the file sizes, the memory requirements may be easily estimated.

For each iteration of impure file sorting, the clustering improvement system schedules background tasks in an order that is determined with a goal of improving user query performance (e.g., toward maximizing user query performance). The order of performing sorting tasks may be determined based on a static analysis of the clustering of data in the impure partition. Alternatively, or in addition, the order of the sorting tasks may be determined dynamically by prioritizing subsets of impure files accordingly to user workloads and which partitions or files are being queried more often. Methods and systems for prioritizing impure files for sorting tasks are described in more detail below. Note that the sorting tasks may be executed in parallel, as each sorting task may work on an independent dataset. The degree of parallelism may be decided for each iteration of sorting, based on the current system load and resource constraints. In instances where a particular sorting task fails, the system may re-schedule the task in a subsequent iteration, so as not to cause downtime to the user's system.

The methods and systems provided herein address how to select the impure files for each sorting iteration, and what may be a preferred way of selecting the impure files. A number of impure files to select for each sorting iteration may be selected in the cases that not all files of the impure partition may be selected at once. Moreover, methods are provided for determining a converged state (e.g., when the clustering process is complete or cannot make an additional improvement to the clustering of files in the impure partition).

Example embodiments are described as follows for incrementally improving clustering in an impure partition. An impure partition may include multiple impure files. Different rows in an impure file may be associated with different pure partitions, and rows associated with a particular pure partition may occur in multiple impure files. Impure files of an impure partition are sorted (e.g., clustered), and when enough rows are grouped in the impure partition to form a pure file, a new pure file containing the rows is created and moved to a target pure partition.

Figure 1B:
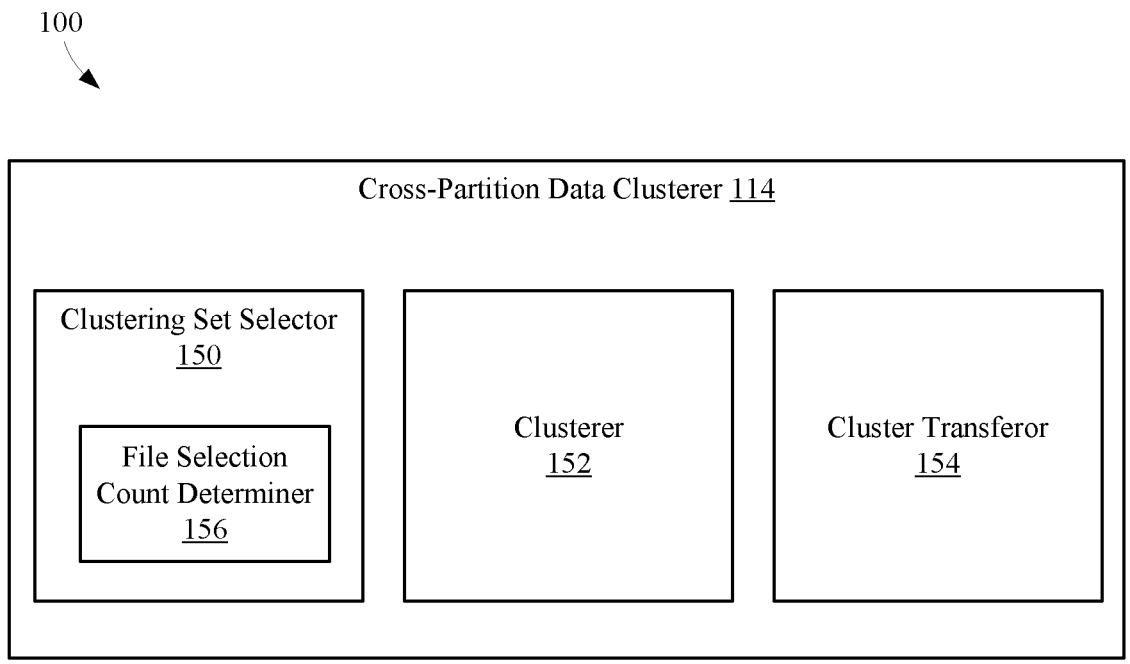
FIG. 1B is a block diagram of a cross-partition data clusterer of FIG. 1A, according to an example embodiment.

FIGS. 1A and 1B are block diagrams of systems for incrementally improving clustering of cross partition data in a distributed data system, according to example embodiments. For example, referring to FIG. 1A, a system 100 for incrementally improving clustering of cross partition data in a distributed data system is shown, according to an embodiment. System 100 includes a computing system 102, a storage device 104, and a user query 116. System 100 also includes a front end 108, a compute node pool 106, a distributed query processor 110, compute nodes 112A, 112B, 112C, and 112D, and a cross partition data clusterer 114. The group of compute nodes including 112A, 112B, 112C, and 112D may be referred to as compute nodes 112 or compute nodes 112A-112D. System 100 also includes a storage device 104, a dataset 120, a first pure partition 122A, a second pure partition 122B, a third pure partition 122C, a first impure file 124A, a second impure file 124B, a first clustered file 126A, a second clustered file 126B, a file 128, and an impure partition 130.

In general, computing system 102 is configured to store data in storage device 104, and to respond to user queries by retrieving data from storage device 104. Computing system 102 is also configured to process the data stored in storage device 104 and reorganize it for faster data retrieval and more efficient use of system 100 resources.

Computing system 102 may be a single computing device or may include multiple interconnected computing devices. For example, computing system 102 may include a computing device with front end 108 and distributed query processor 110. Distributed query processor 110 may be communicatively coupled to compute nodes 112 via a network. Compute nodes 112 may each be a computing device that is operable to perform the embodiments described herein. In some embodiments, compute nodes 112 may function as a virtual machine managed by distributed query processor 110.

As described above, computing system 102 and compute nodes 112 may include one or more computing devices. The one or more computing devices may include one or more computers, servers, mobile devices, etc. that are configured to communicate with storage device 104. For example, computing system 102 may include one or more of a stationary computing device such as a desktop computer or personal computer, a super computer, a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony Play Station®, Nintendo Wii® or Switch®, etc.), etc. In some embodiments, the functionality of computing system 102 may be included in a single device. The one or more computing devices of the computing system 102 are described in more detail with respect to FIG. 6 below.

Front end 108 is a storage interface that is configured to store data received from an external device in storage device 104, and retrieve data from storage device 104 in response to a user query. When data is received from an external source, front end 108 may skip routing data to compute nodes 112 and directly write to storage device 104 (e.g., to impure or pure partitions). In instances when there are enough data rows to form a pure file, the front end 108 may compress the rows of data into a row or a columnar format to form a file and store the file in a pure partition, for example, as file 128 stored in third pure partition 122C. In instances where there are not enough data rows to compress into a pure file, front end 108 may be configured to label the rows of data or associate the rows of data with a partition identifier (ID) of a target pure partition, and combine the rows of data with data from one or more partitions to form an impure file. The impure file may then be compressed and stored in the impure partition 130, such as first impure file 124A or second impure file 124B. Referring to FIG. 1A, first impure file 124A has data rows associated with multiple target pure partitions including first pure partition 122A and second pure partition 122B. Similarly, second impure file 124B has data rows associated with first pure partition 122A and second pure partition 122B. Although rows of impure files 124A and 124B are associated with first pure partition 122A and second pure partition 122B, impure files 124A and 124B are stored together in impure partition 130. In other words, an impure file stored in impure partition 130 may be associated with two or more target pure partitions, and different impure files may each be associated with a different set of target pure partitions or the same set of target pure partitions.

Front end 108 may be a user interface that is further configured to receive data query signals such as user query 116. User query 116 may include a user's request to retrieve data from storage device 104. User query 116 may indicate a file to be retrieved from storage device 104. Front end 108 is configured to forward information based on user query 116 to distributed query processor 110.

In general, distributed query processing is the procedure of answering queries (e.g., performing read operations on large datasets) in a distributed environment where data may be managed at multiple sites in a computer network. Distributed query processor 110 is configured to assign or queue a task for one of compute nodes 112A-112B (e.g., compute node 112A) from compute pool 106 to retrieve data rows requested in user query 116 from storage device 104. Assigned compute node 112A is configured to determine a partition of interest associated with the requested file, and scan the partition of interest for the requested file. For example, the queried data may be in file 128 and the assigned compute node 112 may determine that the partition of interest is third pure partition 122C. The assigned compute node 112A may scan third pure partition 122C and retrieve file 128. Additional rows of data associated with pure partition 122C may be stored in impure partition 130 that includes first impure file 124A and second impure file 124B. The assigned compute node 112A is configured to scan impure files 124A and 124B and retrieve any additional rows associated with the pure partition of interest (e.g., third partition 122C).

Storage device 104 may include one or more computer memory devices that may be communicatively coupled to computing system 102 and/or compute nodes 112. For example, storage device 104 may include suitable logic, circuitry, and/or code to store and retrieve data for computing system 102. Storage device 104 may include the dataset 120, which is partitioned. For example, dataset 120 includes first pure partition 122A, second pure partition 122B, and third pure partition 122C. Dataset 120 may also include impure partition 130. Each of the impure files 124A and 124B are stored in impure partition 130 and associated with first pure partition 122A and second pure partition 122B. For example, data rows or files within the impure files may be labeled with a partition ID corresponding to first pure partition 122A or second pure partition B. First pure partition 122A includes clustered file 126A, second pure partition 122B includes second clustered file 126B, and third pure partition 122C includes file 128. First and second clustered files 126A and 126B are also pure files. Although storage device 104 is shown as a single device, storage device 104 may include a plurality of distributed storage devices (e.g., computer memory). Further aspects of storage device 104 are described with respect to FIG. 6.

Computing system 102 also includes cross-partition data clusterer 114 that includes software executed by one or more of compute nodes 112, such as compute node 112C. Cross-partition data clusterer 114 may be configured to sort data rows of impure files 124A and 124B stored in impure partition 130 according to an order key (e.g., a target partition ID) and store the sorted data rows in their respective target partitions (e.g., first pure partition 122A and second pure partition 122B).

Cross-partition data clusterer 114 may be configured in various ways, according to embodiments. For example, FIG. 1B is a block diagram of cross-partition data clusterer 114, according to an example embodiment. As shown in FIG. 1B, cross-partition data clusterer 114 includes clustering set selector 150, clusterer 152, cluster transferor 154, and file selection count determiner 156. Cross-partition data clusterer 114 of FIG. 1B is described as follows, also with continued reference to system 100 of FIG. 1A.

Clustering set selector 150 of FIG. 1B is configured to select a subset of impure files (e.g., a clustering set) from impure partition 130 of FIG. 1A for sorting. As described above, memory constraints may prevent sorting all of the files in impure partition 130 at once. Instead of selecting all the impure files in impure partition 130 for sorting, only a subset of the impure files may be selected and sorted. File selection count determiner 156 may determine how many files to include in a sorting iteration. The number of impure files to sort may be determined based on system constraints and the current system load. For example, memory requirements for the sorting process may be proportional to the number of impure files selected to be sorted concurrently. In instances where there are upper bounds on file sizes, the memory requirements may be easily estimated.

Various methods may be used for selecting files of impure partition 130 for a clustering set. For example, for each iteration of sorting, clustering set selector 150 may select a subset of files (e.g., the clustering set) to be sorted. In some embodiments, clustering set selector 150 may score each of the impure files (e.g., based on quality or scan frequency), select a candidate impure file, and then select one or more neighbor impure files for the candidate file, to form the subset of impure files to be clustered. A candidate impure file and a neighbor impure file may be referred to as a candidate file and a neighbor file respectively. The file selection process may be divided into two phases. For example, a first phase may be a candidate file selection process where the candidate file is the first file identified for sorting (e.g., the choice of the candidate file may be determined based on input from customer workload data or static quality analyses data). A second phase may be a neighbor file selection process. For example, given the selected candidate file, clustering set selector 150 may determine which impure files to sort with the candidate file. The candidate file may then be sorted with the selected neighbor files. An example of candidate and neighbor file selection is described below.

As described above, system 100 may sort (or cluster) the data rows of selected impure files (from impure partition 130) based on which target partition each data row belongs to, or is associated with. A key data structure may be created by clustering set selector 150 to keep track of which impure files of impure partition 130 have data rows associated each target partition. Table 1 below provides an example of impure files stored in an impure partition:

TABLE 1

Impure Files of an Impure Partition

| Impure Files | Target Partition Range (Min Partition ID to Max Partition ID, Inclusive) |
|---|---|
| FILE11 | 1 to 4 |
| FILE25 | 1 to 2 |

TABLE 1-continued

Impure Files of an Impure Partition

| Impure Files | Target Partition Range (Min Partition ID to Max Partition ID, Inclusive) |
|---|---|
| FILE33 | 1 to 3 |
| FILE41 | 2 to 3 |
| FILE56 | 3 to 4 |
| FILE80 | 1 to 3 |

Referring to Table 1, the impure partition (e.g., impure partition 130) includes six impure files with file IDs: 11, 25, 33, 41, 56, 80. The impure files are each associated with multiple target partitions of the four target partitions 1-4. Table 2 below provides an example of a depth map which indicates the depth of each of the target partitions 1-4:

TABLE 2

Depth Map for Target Partitions 1-4

| Partition ID | 1 | 2 | 3 | 4 |
|---|---|---|---|---|
| File IDs | FILE11 | FILE25 | FILE41 | FILE11 |
| | FILE33 | FILE41 | FILE33 | FILE56 |
| | FILE25 | FILE11 | FILE56 | |
| | FILE80 | FILE33 | FILE80 | |
| | | FILE80 | FILE11 | |
| Depth | 4 | 5 | 5 | 2 |

In Table 2, the depth of a particular target partition is based on the number of impure files in impure partition 130 that have data rows associated with that particular target partition (i.e., the number of overlapping impure files associated with that particular target partition). This information may be useful in knowing which impure files have data rows for similar target partitions and should be sorted together.

A breadth map (or mathematical model) may be created to determine the "breadth" of an impure file. Breadth of an impure file may be defined as the sum of the depths of all target partitions having a depth greater than 1, that the impure file is associated with. This information indicates the potential reduction of depth in the whole system (e.g., from impure partition 130 of dataset 120) by clustering and removing data rows of an impure file (e.g., FILE11) from impure partition 130. Target partitions with a depth equal to 1 are excluded from the breadth calculation as a depth equal to 1 means that the target partition does not have overlapping files. Referring to Tables 1 and 2, the impure file with the greatest breadth is FILE 11. FILE11 has a breadth of 16, as it has data rows associated with all of the target partitions 1-4. The sum of depths for target partitions 1 to 4 is: 4+5+5+2=16. The breadth map may be used in "max breadth" type candidate and neighbor file selections as described below.

In some embodiments, the goal of candidate file selection is to select the first file to be included in the clustering set. A better technique for candidate file selection will yield faster convergence in the reduction of cross partition data, and/or fewer sorting iterations to reach convergence.

In some embodiments, a candidate impure file may be selected dynamically based on workload analysis (e.g., current work load, such a queue of one or more queries issued against rows in the file), or by static analysis of impure files and data distribution. An example of a dynamic candidate file selection process based on workload analysis may include monitoring various system metrics kept for the impure files. For example, various hotness (e.g., count of times a file is accessed) and cost metrics, per impure file, may be updated as the impure files are accessed for user queries (e.g., customer or user work load). For example, some of the metrics may indicate how many times an impure file is scanned for a user query. This information may be used to prioritize potential candidate impure files that are more important or relevant based on the current workload.

Various different processes may be utilized for selecting an impure file as a candidate file based on static analysis. In some embodiments, a "per partition" process may be used for candidate file selection. In this process, clustering set selector 150 may utilize a depth map to select the candidate file. For example, beginning with impure files associated with a first target partition having a depth greater than or equal to 2, which may be a configurable threshold (e.g., target partition 1 shown in Table 2), clustering set selector 150 may select a first impure file that has not been selected as a candidate file, and mark the selected impure file as discovered. This process may be repeated for the same target partition. If the depth for that target partition is greater than two and all the impure files associated with that target partition have been discovered, clustering set selector 150 may proceed to the next target partition in the depth map (e.g., target partition 2). This process may continue until clustering set selector 150 has selected all the files in the depth map and there are no further candidate impure files.

In some embodiments, a process for selecting an impure file as a candidate file may be referred to as a "max depth process." In this process, clustering set selector 150 may utilize a depth map to make the impure file selections. For example, clustering set selector 150 may select any impure file associated with the target partition that has the greatest depth in the depth map and mark the selected impure file as discovered. This process is repeated until the greatest depth of any target partition in the depth map is 2, at which point there are no additional candidate files available. In this manner a file is selected for a target partition that has the maximum number of overlapping files in the impure partition.

In some embodiments, a process for selecting an impure file as a candidate file may be referred to as a "max breadth process." The breadth of an impure file included in the depth map may be determined as the sum of the depths of all the target partitions of which rows of the impure file are associated, where only target partitions with depths having a configurable value greater than or equal to 2 are included in the summation. In the max breadth process, the impure file with the greatest breadth is selected as the candidate file and marked as discovered. This process may be repeated until the greatest breadth is zero, in which case there would be no further candidate files. In this manner, the file that is selected as the candidate file has the greatest number of overlaps with other impure files.

In some embodiments, the lowest depth in the depth map may be 2 because it is possible to have two impure files that overlap with respect to only one target partition and the overlap is at file boundaries. For example, the boundary of data rows for one impure file is also the boundary for data rows of the second impure file (e.g., File1 min partition==File2 max partition, or File1 max partition==File2 min partition). Therefore, in many cases, sorting these two impure files would always give same clustering result.

Clustering set selector 150 may also select n number of neighbor impure files for sorting with a given a candidate impure file. Various processes may be used to select the n neighbor files with a goal of reaching clustering convergence faster and/or with fewer clustering iterations.

In some embodiments, neighbor selection by clustering set selector 150 may be based on a process referred to as "per partition process." In this process, using the depth map and starting from the candidate file's lowest partition ID to its highest partition ID (e.g., min partition ID to max partition ID), where the partition depth is greater than 2, the first n impure files that have not yet been selected are selected and marked as selected. This is a simple approach for selecting the neighbor impure files for a candidate impure file.

In some embodiments, neighbor selection by clustering set selector 150 may be based on a process referred to as "max depth." In this process, using the depth map and starting from the candidate file's lowest associated partition ID and going to its highest partition ID (e.g., min partition ID to max partition ID), the target partition with the greatest depth is selected. Then, the first n impure files associated with that target partition, that have not yet been selected, are selected as neighbor impure files, and marked as selected. In this manner, the impure files (neighbors) having the greatest number of overlapping files in the candidate file's partition range are selected as neighbors.

In some embodiments, neighbor selection by clustering set selector 150 may be based on a process referred to as "max breadth process." In this process, from the impure files that overlap with the candidate impure file, n impure files with the greatest breadth values, and which have not yet been selected, are selected as neighbor files and marked as selected. In this manner, neighbor files that are selected are impure files that overlap with the candidate impure file and have the greatest number of overlaps with other impure files in the impure partition.

In some embodiments, neighbor selection by clustering set selector 150 may be based on a process referred to as "max overlap process." In this process, from the impure files that overlap with the candidate file, the selected neighbor files are the n impure files with the highest number of target partitions in common with the candidate file (e.g., maximum overlapping partition range), and which have not yet been selected. The neighbor files are mark as selected. In this manner the impure files with the most overlapping partition range with the candidate file are selected as neighbor files.

In some embodiments, neighbor selection by clustering set selector 150 may be based on a process referred to as "max correlated histograms." In this process, a histogram distribution is generated that indicates the number of rows in an impure file that map to each target partition. The number rows per target partition include minimum and maximum values. The correlation of the candidate's histogram to other overlapping impure files is determined and the impure files having the greatest correlation with the candidate's histogram are selected as the neighbor impure files.

In some embodiments, neighbor selection by clustering set selector 150 may be based on a process referred to as "max sum of overlapping partition rows." In this process, for each of the impure files that overlap with the candidate file (e.g., on their overlapping partitions), the sum of the number of data rows for each impure file in the overlapping target partitions is determined. The impure files having the greatest number of data rows in the overlapping partitions are selected as neighbor impure files. In this manner, impure files that have the greatest number of data rows associated with the target partitions that overlap with the candidate file are selected as neighbors. The impure file histogram described above may be used by clustering set selector 150 to determine the number of data rows associated with each target partition in an impure file.

With reference to FIG. 1B, clusterer 152 is configured to sort data rows of the selected impure files based on order keys of the data rows (e.g., partition IDs corresponding to respective target partitions). Clusterer 152 may generate a set of files with disjoint partition ranges (e.g., each file of the set of files corresponds to a respective target partition). Cluster transferor 154 is configured to transfer each file of the generated files to their respective target partition, and remove the corresponding data rows from the impure partition (e.g., remove the impure files that were selected to be sorted, from the impure partition).

In some embodiments, the clustering set selector 150 selects a subset of impure files as a clustering set, and clusterer 152 sorts the data rows in the clustering set based on their partition IDs, and based on the results, generates files with disjoint target partition ranges (e.g., target partition ranges with an overlap of no more than 1).

It may be assumed that a system with N impure files (files) with X rows each is given.

Partitioning function h:

row→natural number<=K (partition), $h(r_j)=[1, K]$ for each row $r_j$ belonging to an impure file.

This function determines which target partition a given data row ($r_j$) belongs to (or is associated with).

For each impure file, a histogram M returns a number of rows in the impure file mapping to a particular target partition or:

$$M(i)=count(\{r_j\}),$$

where i=[1,K] and $\{r_j\}$ is the collection of rows in the file for which all $r_j \rightarrow h(r_j)=i$.

A cluster/sort operation is defined as: given L number of files, where 1<L<<N, the data rows are re-arranged by creating L new files that obey the following conditions as true:

1. Each output file has X rows.
. For any two output files f1 and f2 of the L files one of the two conditions are true:
  a. Files do not overlap: there does not exist a partition value n for which $M_{f1}(n)>0$ AND $M_{f2}(n)>0$, where $M_{f1}$ and $M_{f2}$ are the row count map for f1 and f2 respectively. Effectively, this means the files do not have a row that maps to the same partition, and therefore are partition disjoint.
  b. Files overlap by at most one value: there exists only a single value n for which $M_{f1}(n)$ AND $M_{f2}(n)>0$ for which both of these conditions are true:
    i. $M_{fj}(n)=0$ for all file maps j in the range [3,L] for L>=3, meaning these are the only files that contain this partition value amongst the L files created by the clustering operation.
    ii. Files contain only a single partition value: $M_{f1}(n)=X$ OR $M_{f2}(n)=X$, meaning that all rows in one of the files map to the same partition value (file is pure) OR $M_{f1}(n)+M_{f2}(n)<X$.

The cost of the clustering operation is defined as 2*L, as L files are read and L new files are written as a result.

By iteratively selecting, sorting, and transferring a subset of impure files from the impure partition to a pure partition, a state of convergence may be reached where there are no more files in the impure partition, or the rows of data in the impure partition are clustered based on their order key (e.g., their target partition ID). In this state, compute nodes 112 may scan for and retrieve data from data storage device 104 more quickly, and therefore, using fewer resources.

Figure 2:
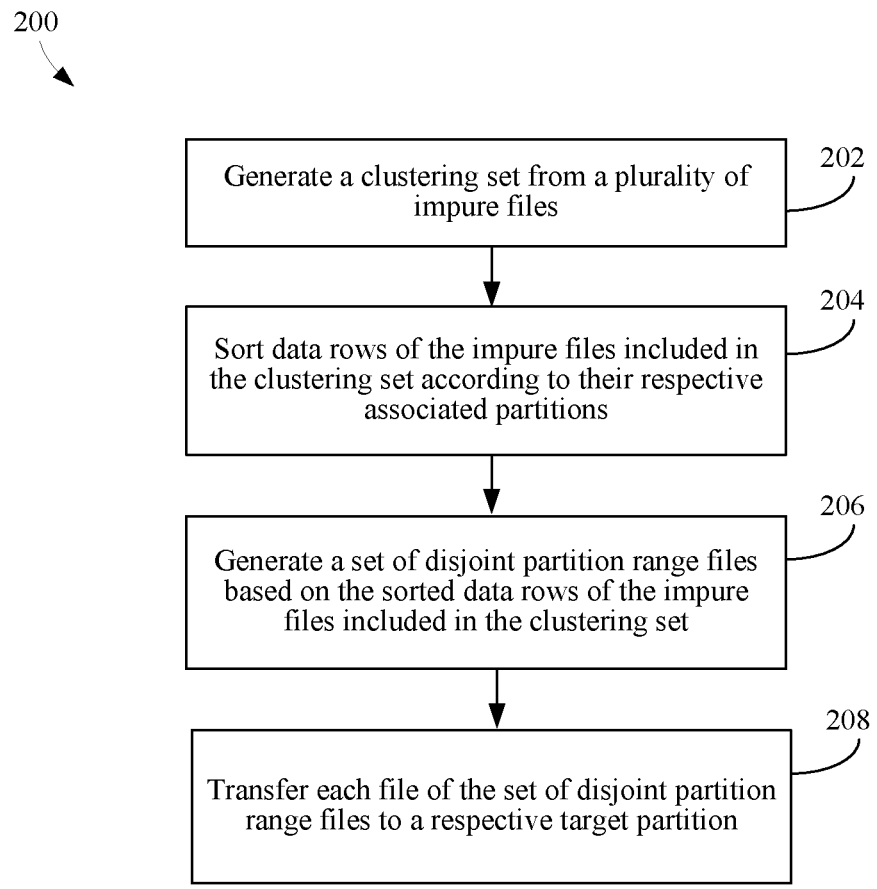
FIG. 2 is a flowchart providing a method for clustering cross partition data for improved user query operations, according to an example embodiment.

In embodiments, system 100 may operate in various ways to perform its functions. FIG. 2 shows a flowchart 200 for clustering cross partition data for improved user query operations, according to an example embodiment. In an embodiment, flowchart 200 may be performed by computing system 102 and storage device 104. For the purposes of illustration, flowchart 200 of FIG. 2 is described with continued reference to FIGS. 1A and 1B.

Flowchart 200 begins with step 202. In step 202, a clustering set is generated from a plurality of impure files. For example, impure partition 130 may include a plurality of impure files. First impure file 124A and second impure file 124B may comprise a subset of the impure files stored in impure partition 130. Cross-partition data clusterer 114 may select a subset of files from impure partition 130 as a clustering set for a sorting process. For example, file selection count determiner 156 may determine the number of impure files to sort at one time. For example, the number of impure files may be based on a current system load metric, memory constraints, or a predicted number of sorting iterations needed to reach zero remaining impure files in the impure partition, or another convergence state. Clustering set selector 150 may select the determined number of impure files as a subset of the files stored in impure partition 130. For example, clustering set selector 150 may identify first impure file 124A and second impure file 124B as the clustering set files.

In step 204, data rows of the impure files included in the clustering set are sorted according to their respective associated partitions. Each data row (or file) of the impure files may be associated with a target pure partition. For example, a portion of the data rows of first impure file 124A and a portion of the data rows of impure file 124B are associated with first pure partition 122A. Also, a portion of the data rows of first impure file 124A and a portion of the data rows of impure file 124B are associated with second pure partition 122B. The data rows (or files) of first impure file 124A and second impure file 124B may be labeled with an order key, for example, a partition ID of the respective associated pure partition. Clusterer 152 may sort the data rows (or files) of the clustering set based on the order keys of the data rows (or files) in the cluster set.

In step 206, a set of disjoint partition range files are generated based on the sorted data rows of the impure files included in the clustering set. For example, as a result of sorting the clustering set comprising first impure file 124A and second impure file 124B, the data rows of first impure file 124A and second impure file 124B may be ordered such that data rows corresponding to each particular target pure partition form a contiguous group of data rows (e.g., a set of disjoint partition range data rows). Clusterer 152 may generate a file for each group of data rows associated with the same target pure partition (e.g. a set of disjoint partition range files). For example, after clusterer 152 sorts the data rows of first impure file 124A and second impure file 124B, data rows associated with first pure partition 122A are grouped together and data rows associated with second pure partition 122B are grouped together. Clusterer 152 generates first cluster file 126A including data rows associated with first pure partition 122A and second cluster file 126B including data rows associated with second pure partition 122B. First cluster file 126A and second cluster file 126B are a set of disjoint partition range files.

In step 208, each file of the set of disjoint partition range files are transferred to a respective target partition. For example, cluster transferor 154 transfers the first cluster file 126A to first pure partition 122A, and transfers second cluster file 126B to second pure partition 122B The process may be repeated until the number of data rows (or files) in the impure partition reaches zero or a convergent state. Thus response time to user queries may improve because compute nodes 112 have fewer partitions to scan when searching for a particular file or data rows. Moreover, by reducing query response time, compute resources are freed up for performing a greater number of user queries with the same amount of compute resources.

Figure 3:
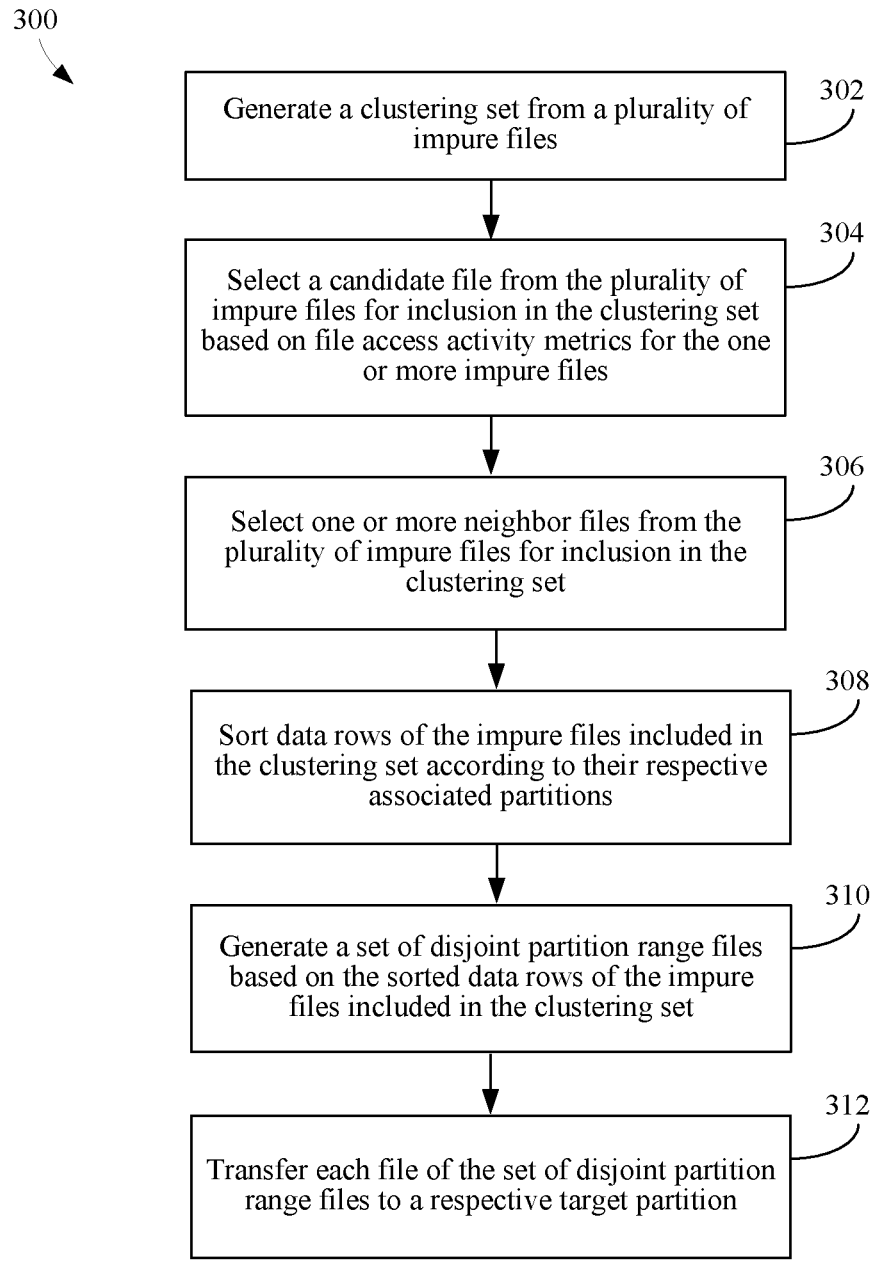
FIG. 3 is a flowchart providing a method for clustering cross partition data based on file access activity metrics for one or more impure files to improve user query operations, according to an example embodiment.

In embodiments, system 100 may operate in various ways to perform its functions. FIG. 3 is a flowchart for clustering cross partition data based on file access activity metrics for one or more impure files to improve user query operations, according to an example embodiment. In an embodiment, flowchart 300 may be performed by computing system 102 and storage device 104. For the purposes of illustration, flowchart 300 of FIG. 3 is described with continued reference to FIGS. 1A and 1B.

Flowchart 300 begins with step 302, in step 302 a clustering set is generated from a plurality of impure files. For example, as described above, first impure file 124A and second impure file 124B may comprise a subset of the impure files stored in impure partition 130. Distributed query processor 110 may assign or queue a task for a compute node of compute node pool 106 (e.g., compute node 112C) to select a subset of files from impure partition 130 as a clustering set for a sorting process. In response, cross-partition data clusterer 114 may select the clustering set. For example, the file selection count determiner 156 may determine the number of impure files to sort at one time. The number of impure files to sort may be based on a current system load metric, memory constraints, or a predicted number of sorting iterations needed to reach zero remaining impure files in the impure partition, or another convergence state. Clustering set selector 150 may select the determined number of impure files as a subset of the files stored in impure partition 130 as the clustering set. In some embodiments the clustering set includes a candidate file selected based on file access activity metrics for the one or more impure files and one or more neighbor files that are selected from the plurality of impure files for inclusion in the clustering set In step 304, a candidate file is selected from the plurality of impure files for inclusion in the clustering set based on file access activity metrics for the one or more impure files. For example, the clustering set selector 150 may monitor various system metrics that are collected for the impure files. Hotness metrics (e.g., indicating a count of times a file is accessed) and resource cost metrics, per impure file, may be updated as the impure files are accessed for user queries (e.g., indicating customer or user work load on computing system 102 and storage device 104). For example, some of the metrics may indicate how many times an impure file is scanned for a user query. This information may be used to prioritize potential candidate impure files. Clustering set selector 150 may select the candidate file based on current workload using the prioritized candidate impure files.

In step 306, one or more neighbor files are selected from the plurality of impure files for inclusion in the clustering set. For example, in a neighbor file selection process, given the selected candidate file, clustering set selector 150 may determine which impure files to sort with the candidate file according to the number of impure files to sort determined by file selection count determiner 156. Various processes may be used to select the neighbor impure files as described in more detail above with respect to FIGS. 1A and 1B.

In step 308, data rows of the impure files included in the clustering set are sorted according to their respective associated partitions. For example, each data row (or file) of the clustering set of impure files may be associated with a target pure partition. Compute node 112C may execute cross-partition data clusterer 114 and clusterer 152. Clusterer 152 may sort the data rows (or files) of the clustering set based on respective order keys (e.g., respective target partition IDs) of the data rows (or files) in the cluster set.

In step 310, a set of disjoint partition range files are generated based on the sorted data rows of the impure files included in the clustering set. For example, as a result of sorting the clustering set the data rows of the candidate impure file and neighbor impure files may be ordered such that data rows corresponding to each particular target pure partition form a contiguous group of data rows (e.g., a set of disjoint partition range data rows). Clusterer 152 may generate a file for each group of data rows associated with the same target pure partition (e.g. a set of disjoint partition range files) and store the corresponding data rows in the generated files.

In step 312, each file of the set of disjoint partition range files are transferred to a respective target partition. For example, each of the generated files is a pure file including only data rows associated with a respective target partition and are stored in the respective target partition, which is a pure partition.

The process of steps 302 through 312 may be repeated until the number of data rows (or files) in the impure partition reaches zero or a convergent state. In this manner, response time to user queries may improve because compute nodes 112 have fewer files to scan when searching for particular data belonging to a partition or partition ID. Moreover, by reducing query response time, compute resources are freed up for performing a greater number of user queries with the same amount of compute resources.

In the above example embodiments, compute node 112C and cross-partition data clusterer 114 perform all of the steps 202-208 and 302-312. However, in other embodiments, the steps or portions of the steps performed by cross-partition data clusterer 114 may be performed by cross-partition data clusters 114 of multiple compute nodes in compute node pool 106. For example, one compute node of compute node pool 106 may execute functions of file selection count determiner 156 and clustering set selector 150 while another compute node of compute node pool 106 executes functions of clusterer 152 and cluster transferor 154. However, the disclosure is not limited in this regard and execution of the steps and/or portions of steps 202-208, steps 302-312, and/or other steps, methods, or systems described herein, may be distributed in any suitable manner among the compute nodes of compute node pool 106. Methods and systems for distributing tasks for incrementally improving clustering of cross-partition data in a distributed data system are described in more detail below.

Figure 4:
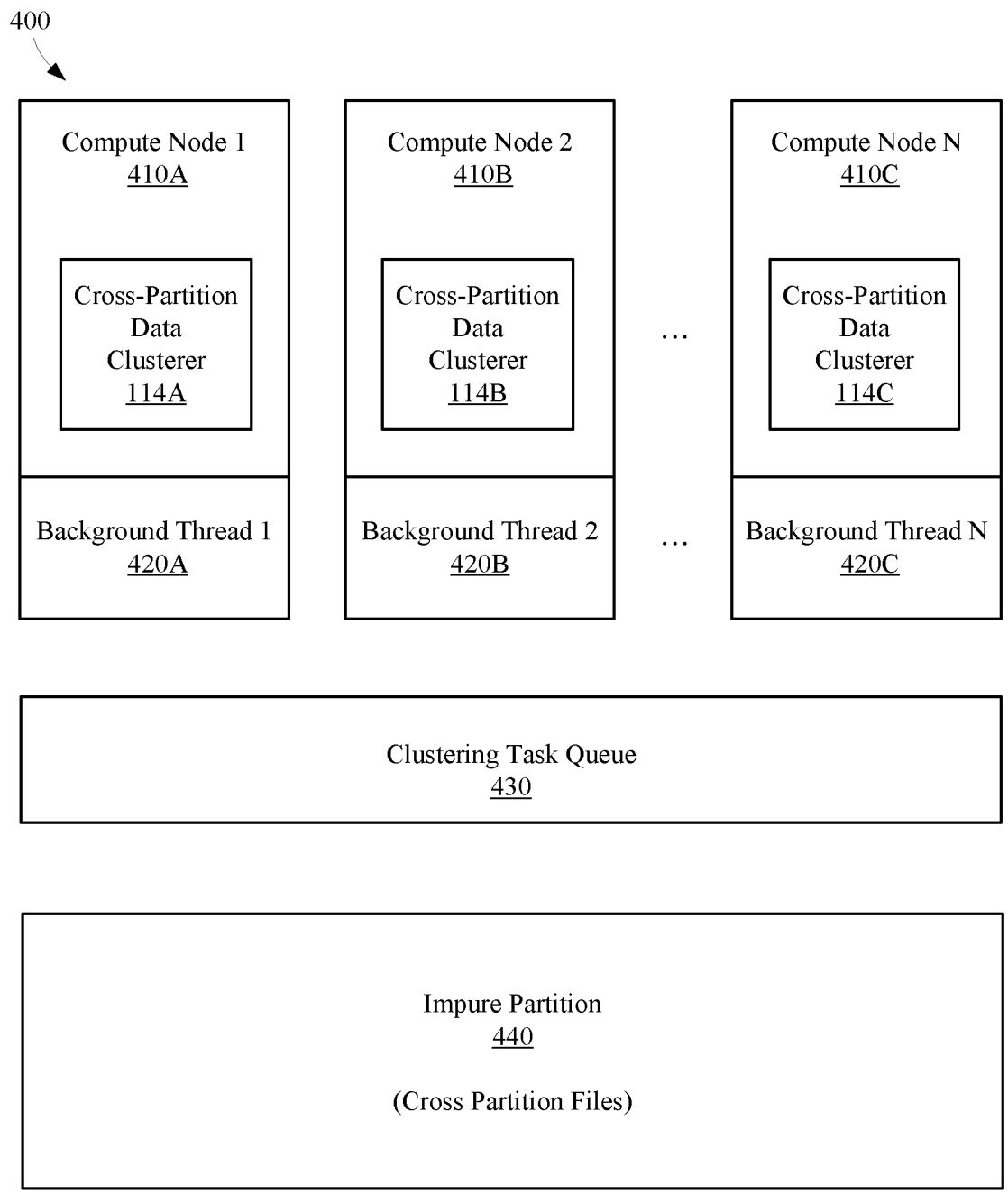
FIG. 4 is a block diagram of an example architecture for executing user workloads and incremental cluster improvement workloads on shared compute nodes using background threads, according to an example embodiment.

A system such as system 100 for improving cross partition clustering may be implemented according to various architectures to perform its functions. FIG. 4 is a block diagram of an example architecture for executing user workloads and incremental cluster improvement workloads on shared compute nodes using background threads, according to an example embodiment. Referring to FIG. 4, there is shown a system 400 including compute nodes 410A-410C, clustering task queue 430, and impure partition 440. System 400 also includes cross-partition data clusters 114A-114C, and background threads 420A-420C.

System 400 is an example architecture that may be utilized to implement system 100. Compute nodes 410A-410C may be similar or substantially the same as compute nodes 112A-112D. Cross-partition data clusterer 114A-114C may be similar or substantially the same as cross-partition data clusterer 114. Impure partition 440 may be similar or substantially the same as impure partition 130. Background threads 420A-420C may execute tasks for incremental cluster improvement in the storage device 104 depending on the implemented system architecture.

In a data warehouse, such as in system 400, where large amounts of data are partitioned, several compute nodes may scan partitioned data. For example, in response to a user query, each compute node 410A-410C may scan a single pure partition or set of pure partitions and may also query the impure partition 440 as it may include data rows associated with a pure partition of interest in the query. As described above, one goal of the disclosed embodiments is to improve clustering in impure partition 130, which may eventually lead to creating a pure file. The pure file may be moved to a respective target pure partition. By doing so, compute nodes 410A-410C no longer need to query impure partition 440 for responding to a user query, because, the files have been transferred to the target pure partition, thereby improving overall query performance.

By design of the system architecture, the impure file selection processes described above may be decoupled from the clustering processes (e.g., sorting processes). For example, in system 400 a compute node 410A, which may be configured to execute file selection processes, may be decoupled from other compute nodes 410B and 410C that may be configured to execute the clustering processes. In system 400, there are multiple compute nodes 410A-410C that may access impure partition 440. Compute node 410A may be configured to execute an impure file selection process based on impure files stored in impure partition 440, and may also be configured to schedule a clustering task in clustering task queue 430 for the selected impure files. For example, clustering task queue 430 may be configured as a global queue that is accessible by all of compute nodes 410A-410C. Compute node 410B or compute node 410C may be configured to retrieve the clustering task from clustering task queue 430 and execute a sorting process (e.g., a sorting iteration) on the files selected by compute node 410A.

By executing clustering tasks across multiple compute nodes, clustering (e.g., sorting) may be performed faster while the cost of clustering is shared across multiple compute nodes (e.g., compute nodes 410A-410C). The cost per compute node can vary depending on how much of the clustering task load each compute node is configured to perform at a time. As shown in FIG. 4, each of compute nodes 410A, 410B, and 410C has a respective cross partition data clusterer 114A, 114B, or 114C, and has a configurable number (n) of background threads per compute node (e.g., 420A, 420B, or 420C). Background threads 420A, 420B, and 420C may be configured to execute selection and/or clustering tasks of the respective cross-partition data clusters 114A, 114B, and 114C as described above with respect to system 100. For example, background thread 420B may be configured to retrieve a clustering task from cluster task queue 430, execute sorting of the selected impure files from impure partition 440, generate a set of disjoint partition range files as a result of the sorting, transfer each file of the set of disjoint partition range files to a respective target partition.

The architecture shown in FIG. 4 may be configured to prevent a background thread, which is configured to perform clustering of impure files, from consuming too large a portion of a compute node's resources and thereby reduce the availability of resources for user queries (e.g., slowing down query speed). As the number of files being clustered at one time increases, the amount of resources needed to execute the cluster process also increases. Therefore, the number of files to be clustered in a clustering cycle is automatically and dynamically configurable by the file section count determiner 156 before each file selection iteration to control the percentage of resources allocated to clustering processes versus the user query work load. Moreover, in some embodiments, a compute node 410 that is too busy with user queries may decide not to retrieve any new clustering tasks from the clustering task queue 430, until it spare resources are available.

In one embodiment, background thread 420A on compute node 410A may be configured to execute a file selection process and queue a clustering task for the selected impure files. The other background threads 420B and 420C may be configured to retrieve the clustering task from the queue. In other embodiments, multiple background threads, e.g., background threads 420A and 420B may be configured to execute file selection processes, and/or multiple background threads may be configured for executing clustering processes, for example, depending on how many impure files are stored in the impure partition 440. An advantage of the architecture shown in system 400 is that spare resources may be opportunistically utilized for clustering impure files, on compute nodes 410A-410C that also handle user workloads. Resource consumption for clustering processes on each compute node may be dynamically increased or decreased depending on the spare resources available, which aren't being used for user workload. When the compute nodes are idle, all of the available resources may be used for clustering. In this manner, the speed of the clustering processes may be significantly increased and will in turn benefit the customer workloads in the system.

Figure 5:
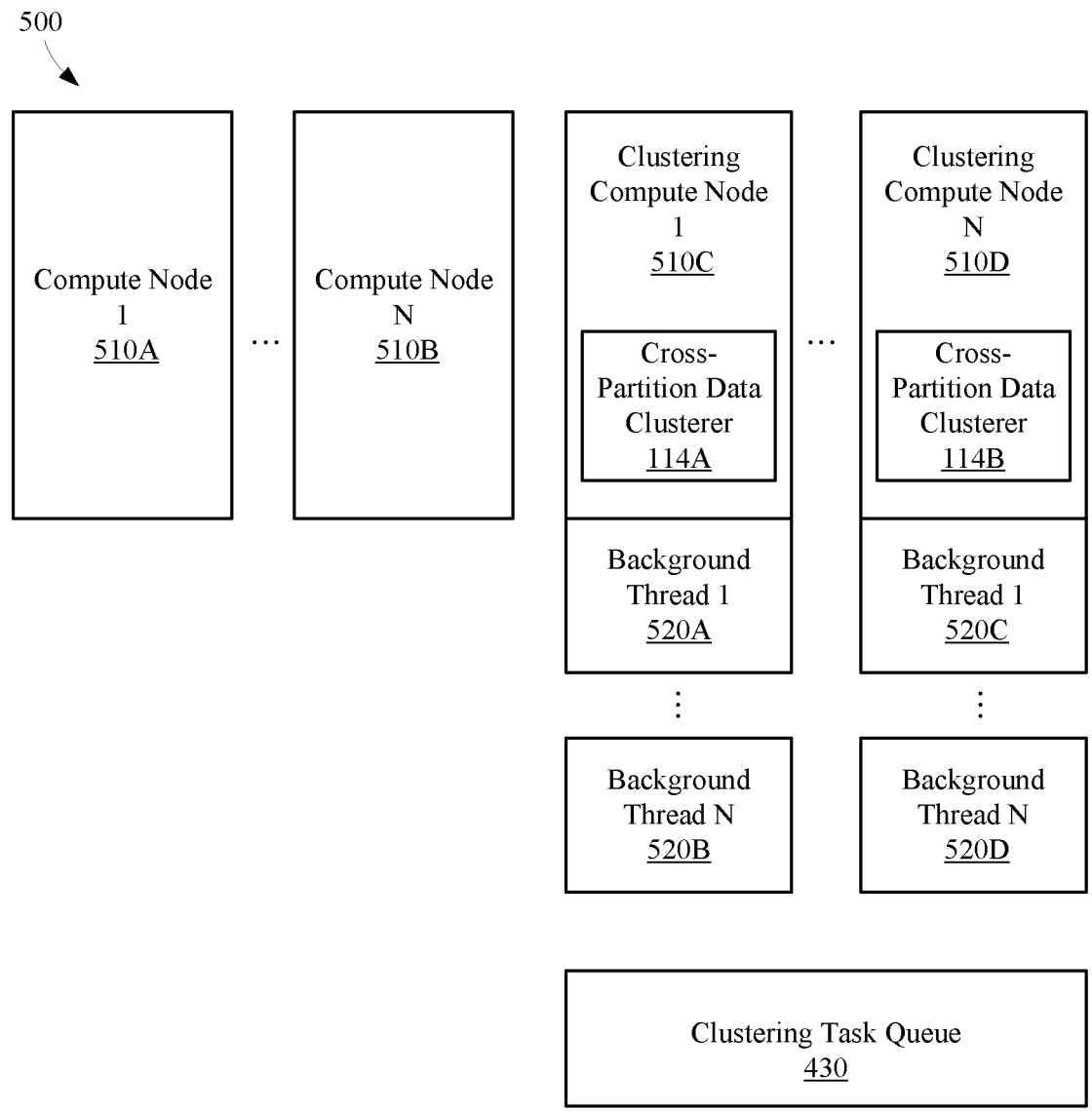
FIG. 5 is a block diagram of an example architecture for executing user workloads and incremental cluster improvement workloads in separate compute node pools, according to an example embodiment.
Figure 5:
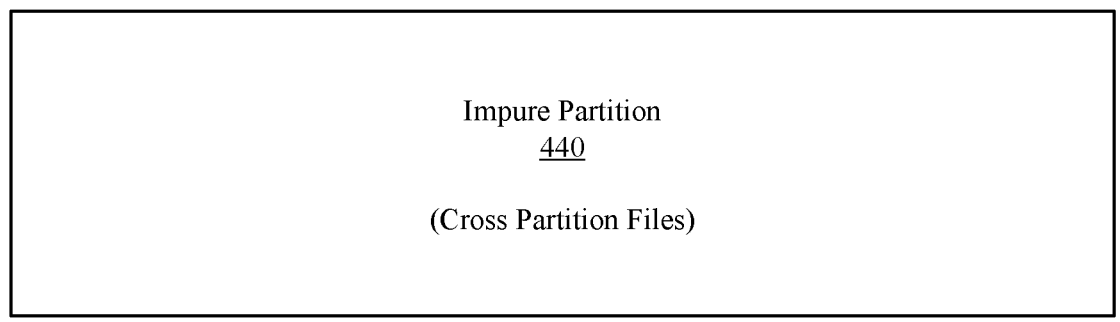

As described above, a system such as system 100 for improving cross partition clustering may be implemented according to various architectures to perform its functions. FIG. 5 is a block diagram of an example architecture for executing user workloads and incremental cluster improvement workloads in separate compute node pools, according to an example embodiment.

Referring to FIG. 5, there is shown a system 500 including compute nodes 510A-510D, clustering task queue 430, and impure partition 440. System 500 also includes cross-partition data clusters 114A-114B and background threads 520A-520D.

System 500 is an example architecture that may be utilized to implement system 100. Compute nodes 510A-510D may be similar or substantially the same as compute nodes 112A-112D. Cross-partition data clusterer 114A-114B may be similar or substantially the same as cross-partition data clusterer 114. Impure partition 440 may be similar or substantially the same as impure partition 130. Background threads 520A-520B may execute processes of cross-partition data clusterer 114A and background threads 520C-520D may execute processes of cross-partition data clusterer 114B. For example, background threads 520A-520D may execute tasks for incremental cluster improvement in storage device 104 depending on the implemented system architecture.

In the architecture of system 500, the clustering system is separated from the user query system by having separate compute pools for user query workloads and impure file clustering workloads. With this type of architecture, the clustering compute pool may be scaled independently from the user query compute pool. Referring to FIG. 5, a user query compute node pool may include compute nodes 510A and 510B. A clustering compute node pool may include compute nodes 510C and 510D. Background threads 520A-520D of the clustering compute node pool may access clustering task queue 430 to retrieve clustering tasks to execute. In some embodiments, background threads 520A-520B of compute node 510C may be configured to execute selection of a subset of impure files from impure partition 440, and background threads 520C-520D may be configured to execute sorting of the selected impure files for transferring of data rows of the impure files from impure partition 440 to respective target partitions. This system 500 architecture advantageously provides a dedicated compute node pool for clustering processes, in which the entire compute resources of the dedicated compute pool may be used for the clustering process and may be scaled independently of the compute node pool dedicated to user query workloads.

Example capabilities of the embodiments of systems 100, 400 and 500 include:

1. Online Processing: The clustering process may be performed completely online without blocking or preventing users from querying their data. This may be achieved with the incremental approach of clustering the data. Since few files are selected per iteration for clustering, the resource requirements for this operation is limited and doesn't affect other operations. Also, operation on the files is transactional and data is not put in an inconsistent state. When new files are created as a result of clustering, the old ones are deleted. Given the process might involve taking locks on certain files, which might interfere with the performance of user queries involving data present in these files, a policy may be set in place that will cancel the background task, which will be rescheduled after this user query has finished.

2. Automatic Resource Management and Configuration: In the architecture of system 4, where spare compute node resources are used for clustering, resource management is a key part of the system. A goal for the system is to ensure that the clustering process doesn't hold on to system resources in a way that will impact user queries. By design this architecture provides different layers to automatically control the amount of resources consumed by this process. The number of clustering background threads created on each compute node may be controlled depending on the resources available. This will be reduced to zero, whereby there's no background thread available for clustering, therefore the compute node wouldn't pick up any clustering task from the clustering task queue 430 and won't be involved in the clustering process. By also controlling the number of files to cluster, this also controls the memory requirement for the clustering process. In a situation where the compute nodes 410 are busy with user workload with only little spare resources available, the number of files to cluster will be reduced to the minimum number (e.g., two files), which will consume the least memory.

3. Workload Based and/or Periodic Clustering: This feature allows clustering based on the workload and/or a periodic analysis of the impure partition data for clustering. In the workload-based scenario, several hotness and cost metrics are kept per file in the impure partition as they are touched during the customer workload. This information is used to prioritize candidate files for clustering that are most important or relevant based on the current workload. In a periodic scenario, periodically the candidate file selection algorithms are used to select the candidate file that should be clustered with some neighbor files. These two approaches are not mutually exclusive and can both be used in a system.

4. Decoupled File Selection from File Clustering for Scalability: This approach decouples the file selection process from the file clustering process. File selection can occur on a different compute node(s) or the same compute node(s) with file clustering, independently. A queue is used to hold the clustering tasks scheduled as a result of the files selected. Either a global or a local queue may be used depending on if selection and clustering are running on the same or different node. This aspect of the architecture allows scaling of the file selection and file clustering processes independently.

5. Concurrent Clustering: Clustering tasks may be scheduled to be executed concurrently as a result of the file selection process. The file selection process may select a set of files to be clustered together and ensure that for each iteration, a file doesn't exist in more than one clustering set. Once a file is added to a clustering set, it is marked as selected and prevents the system from adding it to another clustering set. By doing this, each clustering set can be clustered concurrently, as each set is working on a different set of selected files. By concurrently clustering the files, this helps achieve a faster clustering process.

6. Pause/Resume: At any time, the clustering process may be paused and then resumed at later time, even if the data has changed when resuming. On resumption, a cross-partition data clusterer 114 may rebuild the depth map, which allows it to detect changes in the data. This process may involve terminating a file selection thread which in turn leads to an empty clustering task queue 430, and also terminating the file clustering threads. On resumption, the file selection thread and the file clustering threads are re-started. The file selection thread may begin to discover a new set of files to cluster and schedule the clustering task.

7. Dynamic Data: The data in the impure partition 130 may be dynamic, since new data can arrive anytime. This scenario may be handled by the system. For example, on each clustering iteration, before selecting the candidate and neighbor files, the cross-partition data clusterer 114 may rebuild the depth map and detect the changes in the data.

8. Fault Tolerant: Selection of impure files to be clustered is fault tolerant even if the clustering process fails. For example, since the depth map is rebuilt per iteration, the failed clustered files will be added back to the depth map and will be selected again in the next or future iteration depending on whether the impure partition data has changed or not.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

Figure 6:
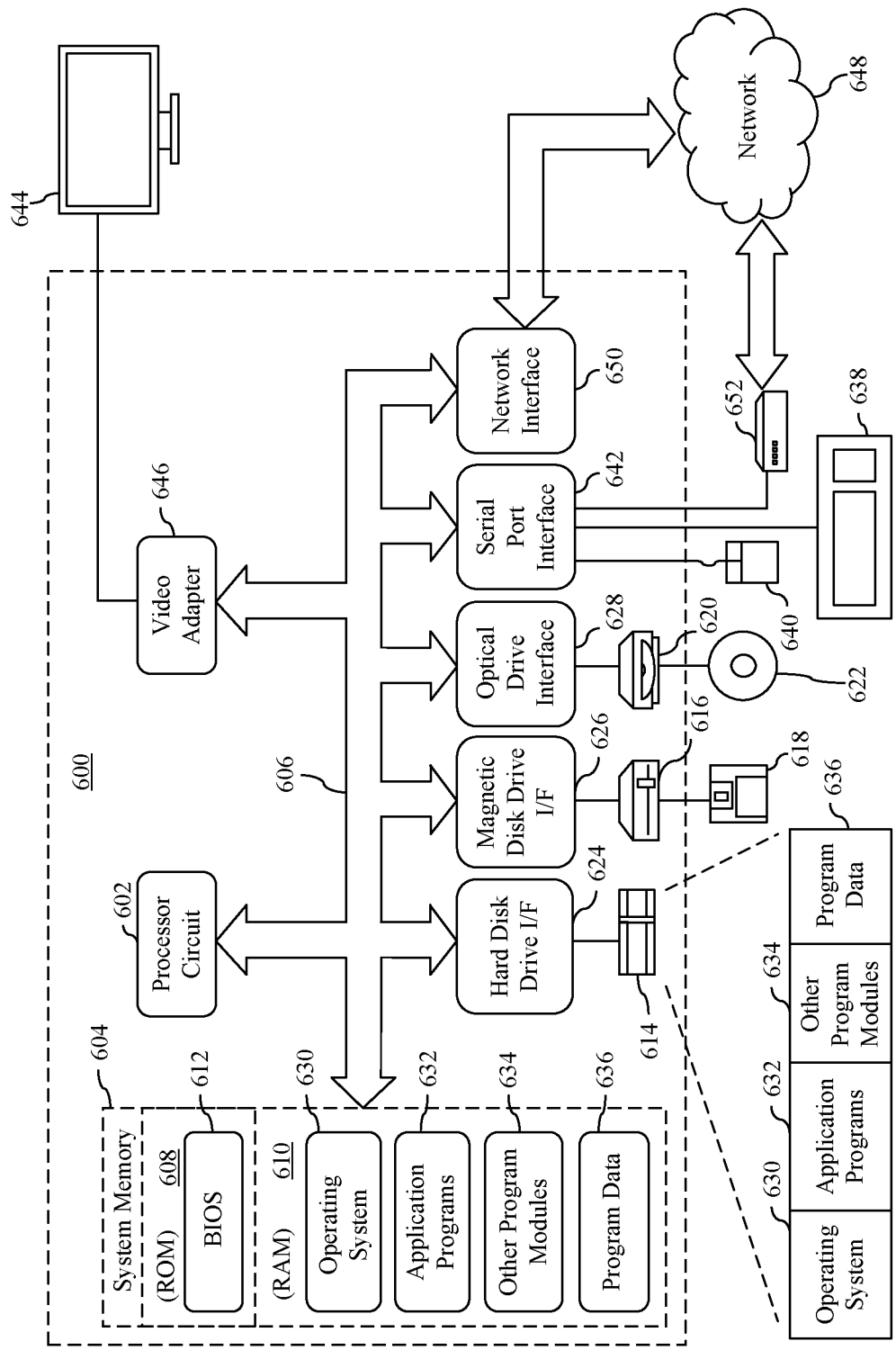
FIG. 6 is a block diagram of an example processor-based computer system that may be used to implement various embodiments.

As noted herein, the embodiments described, including but not limited to, system 100 of FIGS. 1A and 1B, system 200 of FIG. 2, system 400 of FIG. 4, system 500 of FIG. 5, and system 600 of FIG. 6, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 6 is a block diagram of an example processor-based computer system that may be used to implement various embodiments. Computing device 102, storage device 104, and compute nodes 112A-112D, 410A-410C, and 510A-510D may each include any type of computing device, mobile or stationary, such as a desktop computer, a server, a video game console, etc. For example, any of computing device 102, storage device 104, and compute nodes 112A-112D, 410A-410C, and 510A-510D may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo WHO or Switch®, etc.), etc.

FIG. 6 depicts an exemplary implementation of a computing device 600 in which embodiments may be implemented. For example, computing device 102, storage device 104 and compute nodes 112A-112D, 410A-410C, and 510A-510D may each be implemented in one or more computing devices similar to computing device 600 in stationary or mobile computer embodiments, including one or more features of computing device 600 and/or alternative features. The description of computing device 600 provided herein is provided for purposes of illustration, and is not intended to be limiting. Embodiments may be implemented in further types of computer systems, as would be known to persons skilled in the relevant art(s).

As shown in FIG. 6, computing device 600 includes one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random-access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing computing device 102, storage device 104, a front end 108, compute node pool 106, distributed query processor 110, compute nodes 112A, 112B, 112C, and 112D, cross partition data clusterer 114, clustering set selector 150, clusterer 152, cluster transferor 154, file selection count determiner 156, compute node 410A, compute node 410B, compute node 410C, cross-partition data clusterer 114A, cross-partition data clusterer 114B, cross-partition data clusterer 114C, background thread 420A, background thread 420B, background thread 420C, clustering task queue 430, impure partition 440, compute node 510A, compute node 510B, compute node 510C, compute node 510D, cross-partition data clusterer 114A, cross-partition data clusterer 114B, background thread 520A, background thread 520B, background thread 520C, background thread 520D, flowchart 200, flowchart 300, and/or further embodiments described herein. The program data 636 may include dataset 120, first pure partition 122A, second pure partition 122B, third pure partition 122C, first impure file 124A, second impure file 124B, first clustered file 126A, second clustered file 126B, file 128, impure partition 130, impure partition 440, clustering task queue 430, and/or further embodiments described herein.

A user may enter commands and information into computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 642, or any other interface type. Such computer programs, when executed or loaded by an application, enable computing device 600 to implement features of embodiments discussed herein. Accordingly, such computer programs represent controllers of the computing device 600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for improved access to rows of data, where each data row is associated with a partition of a plurality of partitions, the data rows are distributed in one or more files, wherein a file including data rows associated with different partitions of the plurality of partitions is an impure file, the system comprises: one or more processors and one or more memory devices that store program code to be executed by the one or more processors. The program code comprises a clustering set selector that is configured to generate a clustering set from a plurality of impure files. A clusterer is configured to: sort data rows of the impure files included in the clustering set according to their respective associated partitions, and generate a set of disjoint partition range files based on the sorted data rows of the impure files included in the clustering set. A cluster transferor is configured to: transfer each file of the set of disjoint partition range files to a respective target partition.

In an embodiment, the clustering set selector is further configured to: select a candidate file from the plurality of impure files for inclusion in the clustering set, and select one or more neighbor files from the plurality of impure files for inclusion in the clustering set. The candidate file is selected independent of the selection of the one or more neighbor files.

In an embodiment, the clustering set selector is further configured to select the candidate file based on: file access activity metrics for the one or more impure files, analysis of a number of partitions associated with each of the plurality of impure files, or analysis of a number of impure files associated with a partition.

In an embodiment, the clustering set selector, the clusterer, and the cluster transferor are configured to iterate until a number of impure files reaches zero or another convergence state is reached.

In an embodiment, the clustering set selector is executed independently of the clusterer.

In an embodiment, the clusterer is executed: in one or more background threads executed on one or more compute nodes of the one or more processors, wherein the one or more compute nodes are also configured to execute user queries; or in a dedicated compute node pool of the one or more processors, wherein the dedicated compute node pool is configured to execute the cluster set selector, the clusterer, and the cluster transferor, and other compute nodes execute user queries.

In an embodiment, execution of a clustering task by the clusterer is cancelled and rescheduled in response to interference, by the clusterer, of performance of user queries involving the impure files present in the clustering set.

In an embodiment, the system further comprises: a file selection count determiner configured to determine a number of the plurality of impure files to include in the clustering set based on at least one of: a system load metric; memory constraints, or a predicted number of sorting iterations needed to reach zero remaining impure files or another convergence state.

In an embodiment, a method in a computing device for improved access to rows of data, where each data row is associated with a partition of a plurality of partitions, the data rows are distributed in one or more files, wherein a file including data rows associated with different partitions of the plurality of partitions is an impure file, the method comprises: generating a clustering set from a plurality of impure files; sorting data rows of the impure files included in the clustering set according to their respective associated partitions; generating a set of disjoint partition range files based on the sorted data rows of the impure files included in the clustering set; and transferring each file of the set of disjoint partition range files to a respective target partition.

In an embodiment, said generating a clustering set from a plurality of impure files comprises: selecting a candidate file from the plurality of impure files for inclusion in the clustering set, and selecting one or more neighbor files from the plurality of impure files for inclusion in the clustering set; wherein the candidate file is selected independent of the selection of the one or more neighbor files.

In an embodiment, the candidate file is selected based on: file access activity metrics for the one or more impure files, analysis of a number of partitions associated with each of the plurality of impure files, or analysis of a number of impure files associated with a partition.

In an embodiment, steps of said generating, sorting, generating, and transferring are iterated until a number of impure files reaches zero or another convergence state is reached.

In an embodiment, said generating a clustering set from a plurality of impure files is executed independent of execution of said sorting data rows of the impure files included in the clustering set according to their respective associated partitions.

In an embodiment, said sorting data rows of the impure files included in the clustering set according to their respective associated partitions is executed in: one or more background threads executed on one or more compute nodes of the one or more processors, wherein the one or more compute nodes are also configured to execute user queries; or a dedicated compute node pool of the one or more processors, wherein the dedicated compute node pool is configured to execute the cluster set selector, the clusterer, and the cluster transferor, and other compute nodes execute user queries.

In an embodiment, execution of the sorting of data rows of the impure files is cancelled and rescheduled in response to interference of user queries involving the impure files present in the clustering set by the sorting of the impure files.

In an embodiment, the method further comprises: determining how a number of the plurality of impure files to include in the clustering set based on at least one of: a system load metric; memory constraints, or a predicted number of sorting iterations needed to reach zero remaining impure files or another convergence state.

In an embodiment, a method in a computing device for improved access to rows of data, where each data row is associated with a partition of a plurality of partitions, the data rows are distributed in one or more files, wherein a file including data rows associated with different partitions of the plurality of partitions is an impure file, the method comprises: generating a clustering set from a plurality of impure files including: selecting a candidate file from the plurality of impure files for inclusion in the clustering set based on file access activity metrics for the one or more impure files, and selecting one or more neighbor files from the plurality of impure files for inclusion in the clustering set; sorting data rows of the impure files included in the clustering set according to their respective associated partitions; generating a set of disjoint partition range files based on the sorted data rows of the impure files included in the clustering set; and transferring each file of the set of disjoint partition range files to a respective target partition.

In an embodiment, said generating a clustering set from a plurality of impure files is executed independent of execution of said sorting data rows of the impure files included in the clustering set according to their respective associated partitions.

In an embodiment, execution of the sorting of data rows of the impure files is cancelled and rescheduled in response to interference of user queries involving the impure files present in the clustering set by the sorting of the impure files.

In an embodiment, the method further comprises: determining how many of the plurality of impure files to include in the clustering set based on at least one of: a system load metric; memory constraints, or a predicted number of sorting iterations needed to reach zero remaining impure files or another convergence state.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for improved access to rows of data, each data row associated with a partition of a plurality of partitions, the data rows distributed in one or more files, wherein a file including data rows associated with different partitions of the plurality of partitions is an impure file, the system comprising:
   one or more processors;
   one or more memory devices that store program code to be executed by the one or more processors, the program code comprising:
   clustering set selector configured to:
      generate a clustering set from a plurality of impure files;
   a clusterer configured to:
      sort data rows of the impure files included in the clustering set according to their respective associated partitions, and
      generate a set of disjoint partition range files based on the sorted data rows of the impure files included in the clustering set; and
   a cluster transferor configured to:
      transfer each file of the set of disjoint partition range files to a respective target partition.

2. The system of claim 1, wherein the clustering set selector is further configured to:
   select a candidate file from the plurality of impure files for inclusion in the clustering set, and
   select one or more neighbor files from the plurality of impure files for inclusion in the clustering set;
   wherein the candidate file is selected independent of the selection of the one or more neighbor files.

3. The system of claim 2, wherein the clustering set selector is further configured to select the candidate file based on:
   file access activity metrics for the one or more impure files,
   analysis of a number of partitions associated with each of the plurality of impure files, or
   analysis of a number of impure files associated with a partition.

4. The system of claim 1, wherein the clustering set selector, the clusterer, and the cluster transferor are configured to iterate until a number of impure files reaches zero or another convergence state is reached.

5. The system of claim 1, wherein the clustering set selector is executed independently of the clusterer.

6. The system of claim 1, wherein the clusterer is executed:
   in one or more background threads executed on one or more compute nodes of the one or more processors, wherein the one or more compute nodes are also configured to execute user queries; or
   in a dedicated compute node pool of the one or more processors, wherein the dedicated compute node pool is configured to execute the cluster set selector, the clusterer, and the cluster transferor, and other compute nodes execute user queries.

7. The system of claim 1, wherein execution of a clustering task by the clusterer is cancelled and rescheduled in response to interference, by the clusterer, of performance of user queries involving the impure files present in the clustering set.

8. The system of claim 1, further comprising:
   a file selection count determiner configured to determine a number of the plurality of impure files to include in the clustering set based on at least one of:
   a system load metric;
   memory constraints, or
   a predicted number of sorting iterations needed to reach zero remaining impure files or another convergence state.

9. A method in a computing device for improved access to rows of data, each data row associated with a partition of a plurality of partitions, the data rows distributed in one or more files, wherein a file including data rows associated with different partitions of the plurality of partitions is an impure file, the method comprising:
   generating a clustering set from a plurality of impure files;
   sorting data rows of the impure files included in the clustering set according to their respective associated partitions;
   generating a set of disjoint partition range files based on the sorted data rows of the impure files included in the clustering set; and
   transferring each file of the set of disjoint partition range files to a respective target partition.

10. The method of claim 9, wherein said generating a clustering set from a plurality of impure files comprises:
    selecting a candidate file from the plurality of impure files for inclusion in the clustering set, and
    selecting one or more neighbor files from the plurality of impure files for inclusion in the clustering set;
    wherein the candidate file is selected independent of the selection of the one or more neighbor files.

11. The method of claim 10, wherein the candidate file is selected based on:
    file access activity metrics for the one or more impure files,
    analysis of a number of partitions associated with each of the plurality of impure files, or
    analysis of a number of impure files associated with a partition.

12. The method of claim 9, wherein steps of said generating, sorting, generating, and transferring are iterated until a number of impure files reaches zero or another convergence state is reached.

13. The method of claim 9, wherein said generating a clustering set from a plurality of impure files is executed independent of execution of said sorting data rows of the impure files included in the clustering set according to their respective associated partitions.

14. The method of claim 9, wherein said sorting data rows of the impure files included in the clustering set according to their respective associated partitions is executed in:

one or more background threads executed on one or more compute nodes of the one or more processors, wherein the one or more compute nodes are also configured to execute user queries; or a dedicated compute node pool of the one or more processors, wherein the dedicated compute node pool is configured to execute the cluster set selector, the clusterer, and the cluster transferor, and other compute nodes execute user queries.

15. The method of claim 9, wherein execution of the sorting of data rows of the impure files is cancelled and rescheduled in response to interference of user queries involving the impure files present in the clustering set by the sorting of the impure files.

16. The method of claim 9, further comprising:

determining how a number of the plurality of impure files to include in the clustering set based on at least one of:

a system load metric;

memory constraints, or a predicted number of sorting iterations needed to reach zero remaining impure files or another convergence state.

17. A method in a computing device for improved access to rows of data, each data row associated with a partition of a plurality of partitions, the data rows distributed in one or more files, wherein a file including data rows associated with different partitions of the plurality of partitions is an impure file, the method comprising:

generating a clustering set from a plurality of impure files including:

selecting a candidate file from the plurality of impure files for inclusion in the clustering set based on file access activity metrics for the one or more impure files, and selecting one or more neighbor files from the plurality of impure files for inclusion in the clustering set;

sorting data rows of the impure files included in the clustering set according to their respective associated partitions;

generating a set of disjoint partition range files based on the sorted data rows of the impure files included in the clustering set; and transferring each file of the set of disjoint partition range files to a respective target partition.

18. The method of claim 17, wherein said generating a clustering set from a plurality of impure files is executed independent of execution of said sorting data rows of the impure files included in the clustering set according to their respective associated partitions.

19. The method of claim 17, wherein execution of the sorting of data rows of the impure files is cancelled and rescheduled in response to interference of user queries involving the impure files present in the clustering set by the sorting of the impure files.

20. The method of claim 17, further comprising:

determining how many of the plurality of impure files to include in the clustering set based on at least one of:

a system load metric;

memory constraints, or a predicted number of sorting iterations needed to reach zero remaining impure files or another convergence state.

* * * * *